(12) United States Patent
Kim

(10) Patent No.: US 7,503,593 B2
(45) Date of Patent: Mar. 17, 2009

(54) JOINT FOR PLUMBING

(76) Inventor: Suk-Yoon Kim, 1-802 Aju Apartment 374, Galsan2 Bupyeong, Incheon 403-805 (KR)

( * ) Notice: Subject to any disclaimer, the term of this patent is extended or adjusted under 35 U.S.C. 154(b) by 378 days.

(21) Appl. No.: 10/597,437

(22) PCT Filed: Jan. 25, 2005

(86) PCT No.: PCT/KR2005/000206

§ 371 (c)(1), (2), (4) Date: Jul. 25, 2006

(87) PCT Pub. No.: WO2005/071302

PCT Pub. Date: Aug. 4, 2005

(65) Prior Publication Data

US 2008/0191480 A1 Aug. 14, 2008

(30) Foreign Application Priority Data

Jan. 26, 2004 (KR) .................. 20-2004-0001737

(51) Int. Cl.
*F16L 21/08* (2006.01)
*F16L 21/04* (2006.01)
*F16L 19/08* (2006.01)

(52) U.S. Cl. ................ 285/369; 285/104; 285/318; 285/339

(58) Field of Classification Search .......... 285/104, 285/105, 113, 339, 369, 417
See application file for complete search history.

(56) References Cited

U.S. PATENT DOCUMENTS

| | | | | |
|---|---|---|---|---|
| 2,334,687 A | * | 11/1943 | Moll | ................... 285/318 |
| 3,127,196 A | * | 3/1964 | Fabian, Jr. et al. | ......... 285/111 |
| 3,164,361 A | * | 1/1965 | Pruett | ................. 251/149.6 |
| 3,653,691 A | * | 4/1972 | Bram | ................... 285/236 |
| 3,884,508 A | * | 5/1975 | Jones | .................... 285/31 |
| 4,083,585 A | * | 4/1978 | Helm | ..................... 285/260 |
| 4,282,175 A | * | 8/1981 | Volgstadt et al. | ......... 264/248 |
| 4,316,053 A | * | 2/1982 | Rieffle | ................. 174/84 S |
| 4,685,705 A | * | 8/1987 | Jones | ................. 285/148.23 |
| 4,884,830 A | * | 12/1989 | Meisinger | ................. 285/94 |
| 5,328,216 A | * | 7/1994 | Miyauchi et al. | .......... 285/319 |

FOREIGN PATENT DOCUMENTS

| | | | |
|---|---|---|---|
| JP | 52008520 A | * | 1/1977 |
| JP | 06-69526 | | 3/1994 |
| JP | 07-260066 | | 10/1995 |
| JP | 2001-173840 | | 6/2001 |
| KR | 20-0204053 | | 11/2000 |

* cited by examiner

*Primary Examiner*—James M Hewitt
(74) *Attorney, Agent, or Firm*—IPLA P.A.; James E. Bame

(57) ABSTRACT

A joint for plumbing using a wedge action, which can easily and rapidly assemble and disassemble a pipe. The joint can maximize tensile stopping power of the product by mounting a stopper in such a manner as to occupy the maximum area, increase sealing effect and convenience in insertion of the pipe by adopting a packing the most suitable for the joint, and prevent introduction of dust from the outside. For this, a spring is designed in such a way that the final round of the spring forms a round, and thereby the present invention maximizes a stopper receiving capacity. In addition, the present invention adopts an X-ring as a packing, and a dust seal is mounted in an inlet in which the pipe is inserted.

4 Claims, 4 Drawing Sheets

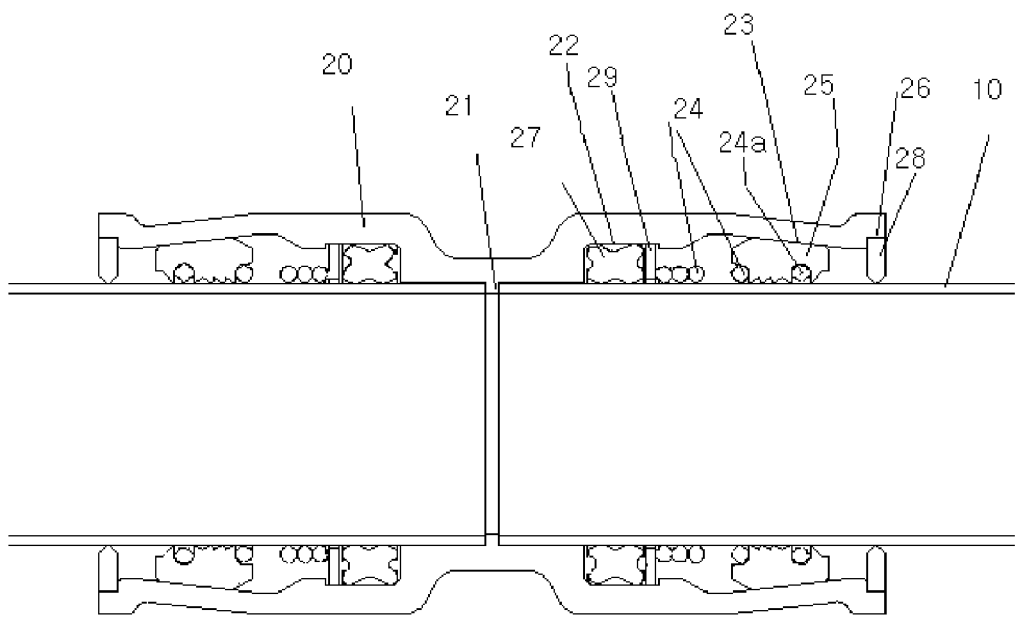
[Fig. 1]

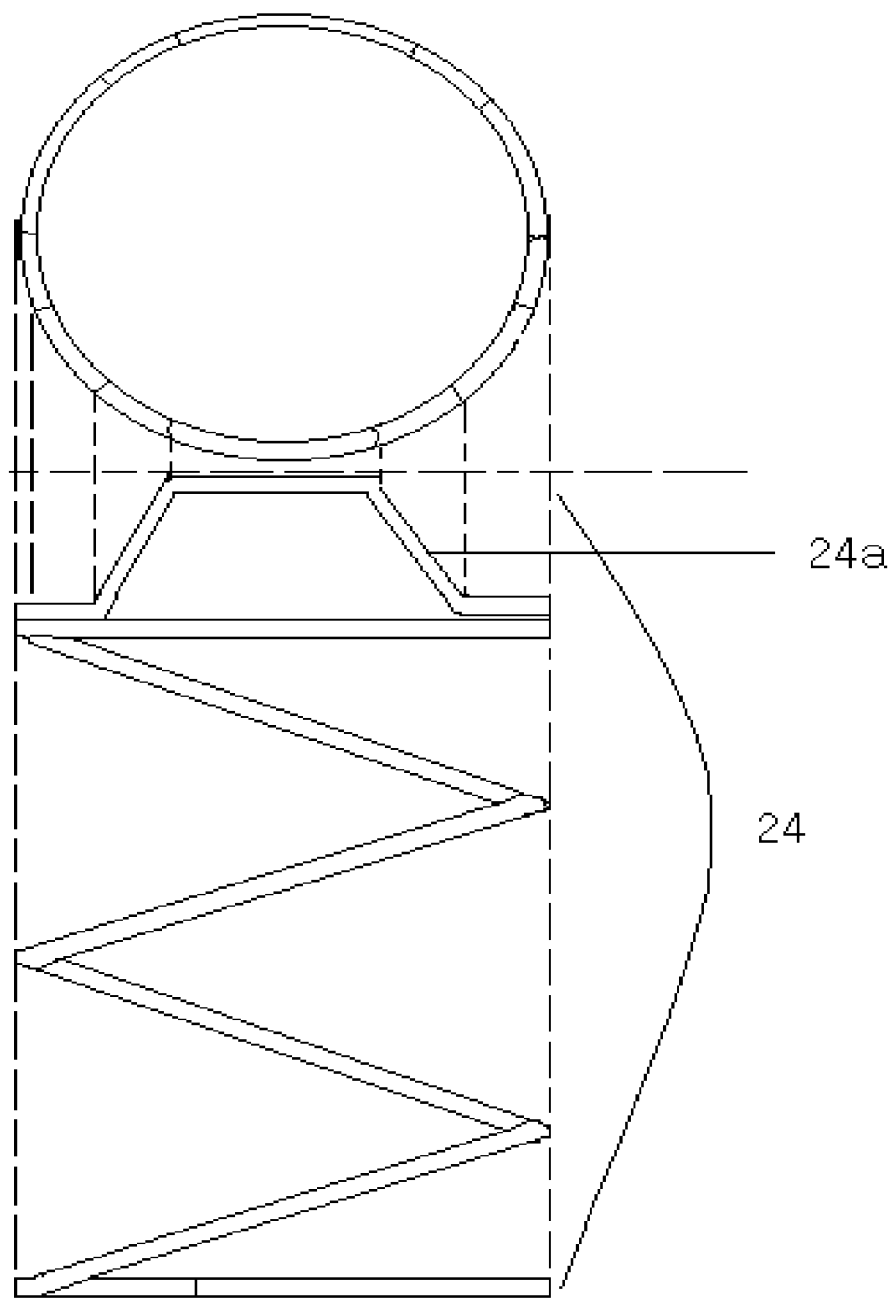
[Fig. 2]

[Fig. 3]
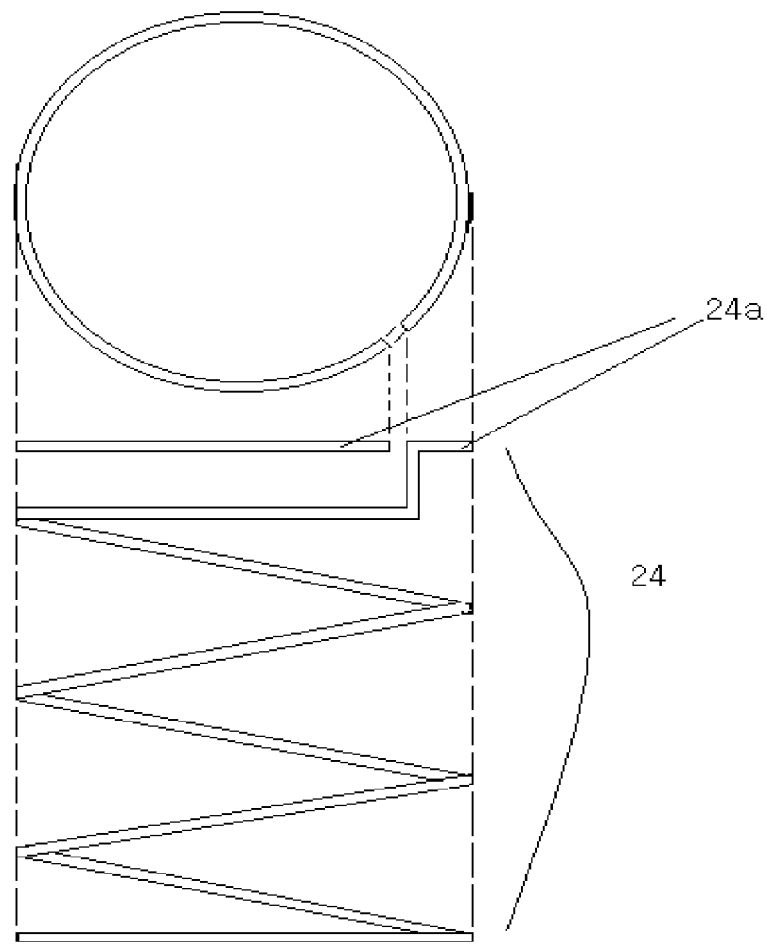
[Fig. 4]
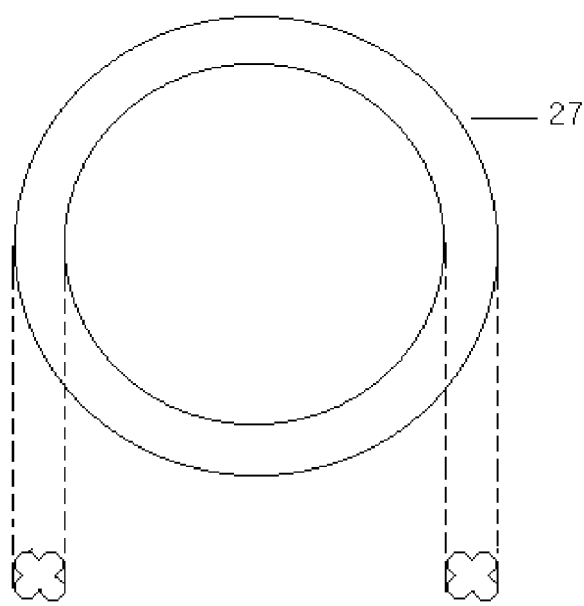

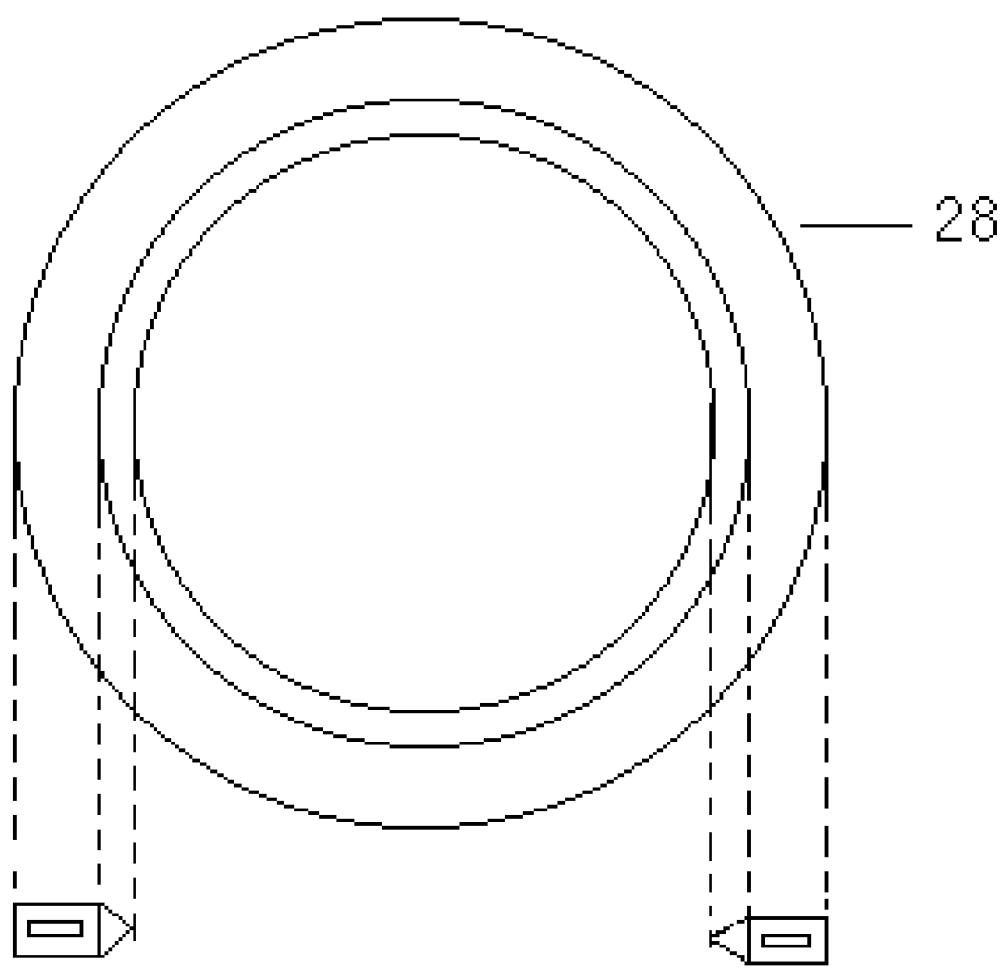
[Fig. 5]

JOINT FOR PLUMBING

TECHNICAL FIELD

The present invention relates to a joint for plumbing using a wedge action, which can easily and rapidly assemble and disassemble a pipe, maximize tensile stopping power of the product by mounting a stopper in such a manner as to occupy the maximum area, increase sealing effect and convenience in insertion of the pipe by adopting a packing the most suitable for the joint, and prevent introduction of dust for the outside.

BACKGROUND ART

In general, a joint using screw coupling can provide a secure and permanent piping, but has several problems in that it is inconvenient to screw and unscrew in a small place, and in that lots of time and manpower are required for piping.

To solve the above problems, a joint for plumbing using a wedge principle (hereinafter, referred to as a wedge type joint. The wedge type joint can complete coupling by inserting a pipe into the joint without any screw structure and deformation of the pipe. A conventional wedge type joint 10 is used in such a way that a stopper is inserted into an entrance of a spring whose the final round is formed in a trapezoidal shape. However, the conventional wedge type joint 10 is not great in tensile stopping power of a product because a contact surface between the stopper and the surface of the pipe is not maximized.

Furthermore, the wedge type joint has to apply power to make the pipe pass a packing when the pipe is inserted therein. For this, conventionally, a Y-ring, an O-ring, or two O-rings are put in the joint, and so, the conventional wedge type joint is larger than the present invention. In the above case, when the compressed rate of the packing is large, the joint provides an excellent sealability but it is difficult to insert the pipe. On the contrary, when the compressed rate is small, the pipe can be easily inserted, but sealability is deteriorated.

Moreover, the conventional joint additionally requires a cap for preventing introduction of dust or sewage when the joint is buried under the ground, but the wedge type joint can have the cap mounted thereon when the joint is buried under the ground as having no screw structure.

DISCLOSURE OF INVENTION

Technical Problem

The present invention has been made in view of the above problems, and is to provide an improved wedge type joint, which has excellent practicality and wide application limit.

Accordingly, it is an object of the present invention to provide a joint for plumbing, which provides a spring having the maximized stopper receiving capacity in order to maximize a pipe contact area of a stopper, thereby increasing friction force and maximizing tensile stopping power of a product.

Another object of the present invention is to provide a joint for plumbing, which provides a packing suitable for the wedge type joint.

A further object of the present invention is to provide a joint for plumbing, which prevents introduction of dust or sewage into the joint.

Technical Solution

In accordance with an aspect of the present invention, the above and other objects can be accomplishes by the provision of joint for plumbing, the joint for plumbing comprising a body 20 having a symmetrical form from the center thereof, the body 20 having stopping parts 21 formed at both sides from the center thereof for stopping a pipe 10 to be inserted into the body 20; extended parts respectively extending from the stopping parts 21 to a predetermined limit of the body 20 for closely contacting and supporting the pipe 10; concave parts 22, each being formed from the extended part to a predetermined limit; tapered parts 23, each having a diameter greater than that of the concave part 22 and gradually narrowed as it goes toward an inlet; and inlets 26, each being formed in such a manner as to be bent in a "L" form at the narrowest end of the tapered part 23 for inserting the pipe 10 thereto; a packing 27 mounted in the concave part 22 inside the body 20 and being in close contact with the outer peripheral surface of the pipe 10 for providing sealability; a spring 24 having an end supported by a protrusion of the concave part 22 and the other end located toward the inlet 26 of the body 20, the other end having the final round 24a and an adjacent round forming a circle, which is at right angles to the insertion direction of the pipe 10, the final round 24a being designed in such a manner as to be positioned in parallel with the adjacent round and at a predetermined interval from the adjacent round; and a stopper 25 inserted between the final round 24a and the adjacent round of the spring 24, which are located toward the inlet 26, wherein a contact surface contacting the tapered part 23 of the body 20 is treated smoothly and a contact surface contacting the pipe 10 has a saw-toothed shape to maximize friction force to the pipe 10, the stopper 25 being greater in hardness than the body 20 or the pipe 10 so that the stopper 25 is inserted between the inner peripheral surface of the body 20 and the outer peripheral surface of the pipe 10 to provide a wedge action to fix the pipe 10 when the pipe 10 is inserted.

Preferably, the final round 24a of the spring is separated from the spring 24.

Preferably, the packing 27 has an X-shaped section in order to increase a pressed rate and allow the pipe 10 to be easily inserted.

Preferably, the dust seal 28 is mounted in the inlet 26 to prevent introduction of dust or sewage from the outside.

Advantageous Effects

Since the final round of the spring of the conventional joint is in the trapezoidal shape, it is complicated to produce the spring, and it is difficult to maximize the pipe contact surface of the stopper. However, the spring according to the present invention allows the stopper of a wide area to be inserted into the joint, thereby maximizing tensile stopping power of the joint.

The present invention increases the pressed rate and sealability and allows the pipe to be easily inserted therein by adopting the X-ring.

By mounting the dust seal in the inlet, the present invention can prevent introduction of dust or sewage, so as to extend lifetime of the product. Furthermore, the present invention does not require additional cap as the pipe is sealed the moment the pipe is inserted, when the pipe is buried under the ground.

BRIEF DESCRIPTION OF THE DRAWINGS

Further objects and advantages of the invention can be more fully understood from the following detailed description taken in conjunction with the accompanying drawings in which:

FIG. 1 is a sectional view of a joint for plumbing according to a preferred embodiment of the present invention;

FIG. 2 is a top and side sectional view of a spring of a conventional joint;

FIG. 3 is a top and side sectional view of a spring according to the present invention;

FIG. 4 is a top sectional view of an X-ring according to the present invention; and FIG. 5 is a top sectional view of a dust seal of the present invention.

BEST MODE FOR CARRYING OUT THE INVENTION

The present invention will now be described in detail in connection with preferred embodiments with reference to the accompanying drawings.

The present invention relates to a wedge type joint for inserting and fixing a pipe into two bodies of a connector.

The wedge type joint has a body 20 having a symmetrical form from the center, and the body 20 includes: stopping parts 21 formed at both sides from the center of the body 20 and having the diameter identical with the inner diameter of a pipe 10 to be inserted into the body 20; extended parts respectively extending from the stopping parts 21 to a predetermined limit of the body 20 for closely contacting and supporting the pipe 10; concave parts 22, each being formed from the extended part to a pre-determined limit toward an inlet 26; tapered parts 23, each having a diameter greater than that of the concave part 22 and gradually narrowed toward the inlet 26; and inlets 26, each being formed in such a manner as to be bent in a "L" form at an end of the tapered part 23 for inserting the pipe 10 thereto.

Hereinafter, the present invention will be described on the basis of one side of the symmetric body 20, since the body 20 of the wedge type joint is in the symmetric form.

A spring 24 is inserted into the tapered part 23. At this time, the final round 24a of the spring 24 located toward the inlet 26 of the body 20 is in parallel with the adjacent round and separated from the adjacent round at a predetermined interval, and is designed to form a circle, which is at right angles to the insert direction of the pipe 10. A stopper 25 is inserted between the final round 24a and the adjacent round for fixing the pipe 10.

The stopper 25 has a saw-toothed portion formed on a contact surface between the stopper 25 and the pipe 10 and corresponding to the shape of the final round 24a and the adjacent round in such a way that the stopper 25 is not moved and separated from the spring 24 after being fit onto the spring 24.

Since the final round 24a is designed to form the circle, the stopper 25 can be inserted in such a manner as to surround almost all of the pipe in order to maximize the pipe contact surface between the final round 24a and the adjacent round of the spring 24, the friction force is also maximized when the pipe contact surface is maximized, and power applied to the body by the stopper is also maximized when tension force is applied, and thereby, the tensile stopping power of the product can be maximized.

The final round 24a of the spring can be separated from the spring 24 for convenience in manufacture and assembly.

The stopper 25 is inserted between the inner wall of the body and the outer wall of the pipe, wherein the portion of the stopper 25 contacting the body 20 is smoothly treated, and the portion contacting the pipe 10 has the saw-toothed shape to maximize the friction force to the pipe 10. In addition, since the stopper 25 is more excellent in hardness than the body 20 and the pipe 10, it provides a wedge action when the pipe 10 is pulled from the outside so as to prevent movement of the pipe 10.

A packing 27 is located in the concave part 22 for maintaining sealability of the joint.

The packing 27 located inside the body 20 is made of rubber or silicon, and is constructed in such a manner as to maintain sealability by being in close contact with the outer peripheral surface of the pipe 10.

The wedge type joint must provide an excellent sealability while being pressed well without applying great power when the pipe 10 is inserted into the joint. It can be satisfied if the X-ring, which has an X-shaped section of the packing 27, is mounted.

The X-ring serves as two O-rings, prevents a partial twist, which may be generated when the pipe 10 is inserted, and makes the pipe 10 easily slide into the joint. Furthermore, recess portions of the X-ring formed in all directions provide spaces where the packing is contracted when the pipe is inserted, thereby increasing a pressed rate of the joint. Therefore, the X-ring is the optimum packing material for the wedge type joint.

If a protrusion of the concave part 22 is replaced with a rounded snap ring 29, it can increase economic efficiency in processing and assembly.

The inner side of the body 20 where the stopper 25 is moved by elasticity of the spring 24 has the tapered part 23, which is gradually narrowed toward the inlet 26, and the narrowest end of the tapered part 23 is bent in the "L" form for preventing movement of the pipe 10 out of the inlet 26.

If a dust seal 28 is mounted on the inlet 26, it can prevent introduction of dust or sewage from the outside, and therefore, additional process for covering a cap on the joint can be omitted, and lifetime of the joint can be extended as lifetime of the components is extended.

The dust seal 28 is molded with rubber material and contains metallic support material therein, and is driven into the inlet 26 of the body 20, and thereby, it can be economically and firmly mounted in the inlet 26.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention relates to a joint for plumbing using a wedge action, which can easily and rapidly assemble and disassemble a pipe, maximize tensile stopping power of the product by mounting a stopper in such a manner as to occupy the maximum area, increase sealing effect and convenience in insertion of the pipe by adopting a packing the most suitable for the joint, and prevent introduction of dust for the outside.

The invention claimed is:

1. A joint for plumbing, comprising:
   a body (20) having a symmetrical form from the center thereof, the body (20) having a stopping part (21) formed in the center thereof for stopping a pipe (10) to be inserted into the body (20); extended parts respectively extending from the stopping parts (21) to a predetermined limit of the body (20) for closely contacting and supporting the pipe (10); concave parts (22), each being formed from the extended part to a predetermined limit; tapered parts (23), each having a diameter greater than that of the concave part (22) and gradually narrowed as it goes toward an inlet; and inlets (26), each being formed in such a manner as to be bent in a "L" form at the narrowest end of the tapered part (23) for inserting the pipe (10) thereto;

a packing (27) mounted in the concave part (22) inside the body (20) and being in close contact with the outer peripheral surface of the pipe (10) for providing sealability;

a spring (24) having an end supported by a protrusion of the concave part (22) and the other end located toward the inlet (26) of the body (20), the other end having the final round (24a) and an adjacent round forming a circle, which is at right angles to the insertion direction of the pipe (10), the final round (24a) being designed in such a manner as to be positioned in parallel with the adjacent round and at a predetermined interval from the adjacent round;

and a stopper (25) inserted between the final round (24a) and the adjacent round of the spring (24), which are located toward the inlet (26), wherein a contact surface contacting the tapered part (23) of the body (20) is smooth and a contact surface contacting the pipe (10) has a saw-toothed shape to maximize friction force to the pipe (10), the stopper (25) being greater in hardness than the body (20) or the pipe (10) so that the stopper (25) is inserted between the inner peripheral surface of the body (20) and the outer peripheral surface of the pipe (10) to provide a wedge action to fix the pipe (10) when the pipe (10) is inserted.

2. The joint for plumbing according to claim 1, wherein the final round (24a) of the spring is separated from the spring (24).

3. The joint for plumbing according to claim 1, wherein the packing (27) has an X-shaped section in order to increase a pressed rate and allow the pipe (10) to be easily inserted.

4. The joint for plumbing according to claim 1, wherein a dust seal (28) is mounted in the inlet (26) to prevent introduction of dust or sewage from the outside.

* * * * *